United States Patent [19]

Tijerina-Ramos

[11] Patent Number: 5,269,828
[45] Date of Patent: Dec. 14, 1993

[54] GOB FORMING DEVICE HAVING A SINGLE ROTATING BLADE WITH A COOLING HOUSING

[75] Inventor: Victor Tijerina-Ramos, Monterrey, Mexico

[73] Assignee: Vitro Crisa Cristaleria, S.A. de C.V., Monterrey, Mexico

[21] Appl. No.: 922,324

[22] Filed: Jul. 30, 1992

Related U.S. Application Data

[63] Continuation-in-part of Ser. No. 633,752, Dec. 26, 1990, abandoned.

[51] Int. Cl.$^5$ .............................................. C03B 7/12
[52] U.S. Cl. ...................................... 65/334; 65/356
[58] Field of Search .................. 65/334, 326, 332, 133, 65/303, 123, 128, 356; 83/171, 593, 199

[56] References Cited

U.S. PATENT DOCUMENTS

| | | |
|---|---|---|
| 1,722,247 | 7/1929 | Hunt . |
| 1,879,684 | 7/1929 | Hunt . |
| 3,287,098 | 10/1962 | Statske ................................. 65/133 |
| 4,944,207 | 7/1990 | Nebelung ............................. 83/162 |

Primary Examiner—W. Gary Jones
Assistant Examiner—John Hoffmann
Attorney, Agent, or Firm—Abelman Frayne & Schwab

[57] ABSTRACT

A Shearing apparatus for forming molten glass gobs from a continuous flow of molten glass provided by a feeder, has a single shear blade mounted on an axis parallel to the axis of feeding of the flow of molten glass; and a drive for imparting a rotatory movement to the blade in coincidence with the flow of molten glass in order to cut the flow into separate molten glass gobs.

1 Claim, 2 Drawing Sheets

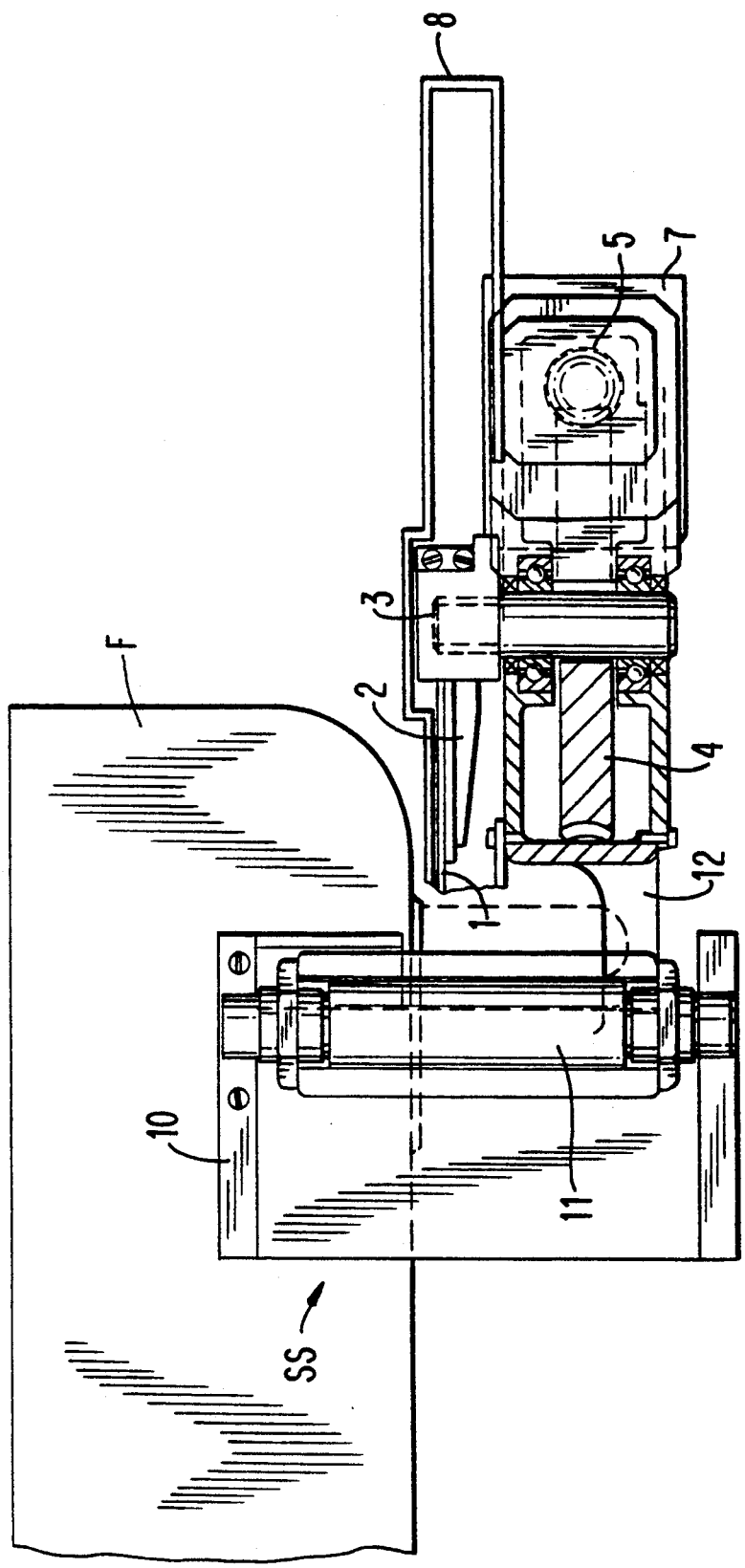

GOB FORMING DEVICE HAVING A SINGLE ROTATING BLADE WITH A COOLING HOUSING

This is a continuation-in-part of application Ser. No. 07/633,752, filed Dec. 26, 1990, now abandoned.

BACKGROUND OF THE INVENTION

A. Field of the Invention

The present invention is related with the art of manufacturing glassware articles and more particularly with an apparatus for cutting off molten glass gobs from a continuous flow of molten glass.

B. Description of the Previous Art

It is well known to form glassware articles from a continuous flow of molten glass from a glass feeder, which is sheared into individual molten glass gobs which are employed to form glassware articles therefrom.

Said molten glass gobs are formed by a shearing apparatus placed under the glass feeder and which usually consist of a pair of shear blades operated by a drive mechanism.

The most common shearing apparatus includes a pair of arms each having first and second ends. Shear blades are mounted on said first ends in opposed relationship and said second ends are coupled to a driving mechanism which provide a reciprocating movement to both arms so as to close and open the first ends carrying said blades to shear the continuous flow of molten glass into a plurality of individual molten glass gobs, as disclosed in the U.S. Pat. Nos. 2,401,994 of Wever; 2,812,619 of F. J. Wythe. 3,758,286 of Heyne and 3,850,607.

Another type of glass gob shearing apparatus is disclosed in the U.S. Pat. No. 3,786,707 of Becker et al. That apparatus comprises a pair of shear blades each respectively supported on a shaft mounted between a pair of rotatable disks driven by a motor. Rotation of the disks is allowed while rotation of the shafts is prevented. Consequently, on each rotation of the disks the shear blades coincide one against the other to cut off a glass gob from the continuous molten glass flow.

Still another type of glass gob shearing apparatus comprise a pair of shear bladed, each slide mounted on a pair of shafts or supporting elements and drive means are provided to impart a linear reciprocal movement to said blades in order to cut off a glass gob in each reciprocating run, as disclosed by the U.S. Pat. Nos. 3,996,037; 4,214,497 and 4,246,819 of Dahms.

All of these shearing apparatuses have the problem that, because of the "scissor type" arrangement of its shear blades, they are susceptible of misalignment and improper meeting causing deformation in the glass gobs and "cutting marks" such as thin long "scratches" in the surface of the gobs and "bites" in its ends, which result in defective glassware articles.

Furthermore, as these defects are not detectable until the finished ware is inspected, these deformations and "cutting marks" can result in a significant quantity of defective articles before the problem be detected and corrected and therefore these shearing apparatus require of continuous supervision and additional sophisticated control and correcting apparatuses.

The shearing apparatus of the present invention overcome all of above disclosed problems and drawbacks by providing a single shear blade driven in such a way that its cutting velocity profile is controlled in order to provide its faster velocity on reaching near to the molten glass flow and instantaneously impact and cut off said glass flow forming a glass gob of desired length and weight.

SUMMARY OF THE INVENTION

It is therefore a main object of the present invention to provide a shearing apparatus for forming glass gobs, having a single shear blade controllably driven to instantaneously cut a glass flow to form glass gobs.

It is also a main object of the present invention, to provide a shearing apparatus of the above disclosed nature, having no problems of misalignment and improper meeting of cutting blades which could cause deformation and "cutting marks" to the gobs.

It is still a main object of the present invention, to provide a shearing apparatus of the above disclosed nature, which is easy to control and requires a minimum supervision and maintaining.

These and other objects and advantages of the shearing apparatus of the present invention will be apparent to the persons skilled in the art, from the following detailed description of a preferred embodiment of the invention provided in combination with the drawing.

BRIEF DESCRIPTION OF THE DRAWINGS

FIG. 2 is schematic lateral view along the line X—X of the apparatus illustrated in FIG. 1.

DETAILED DESCRIPTION OF THE INVENTION

Figure 1:
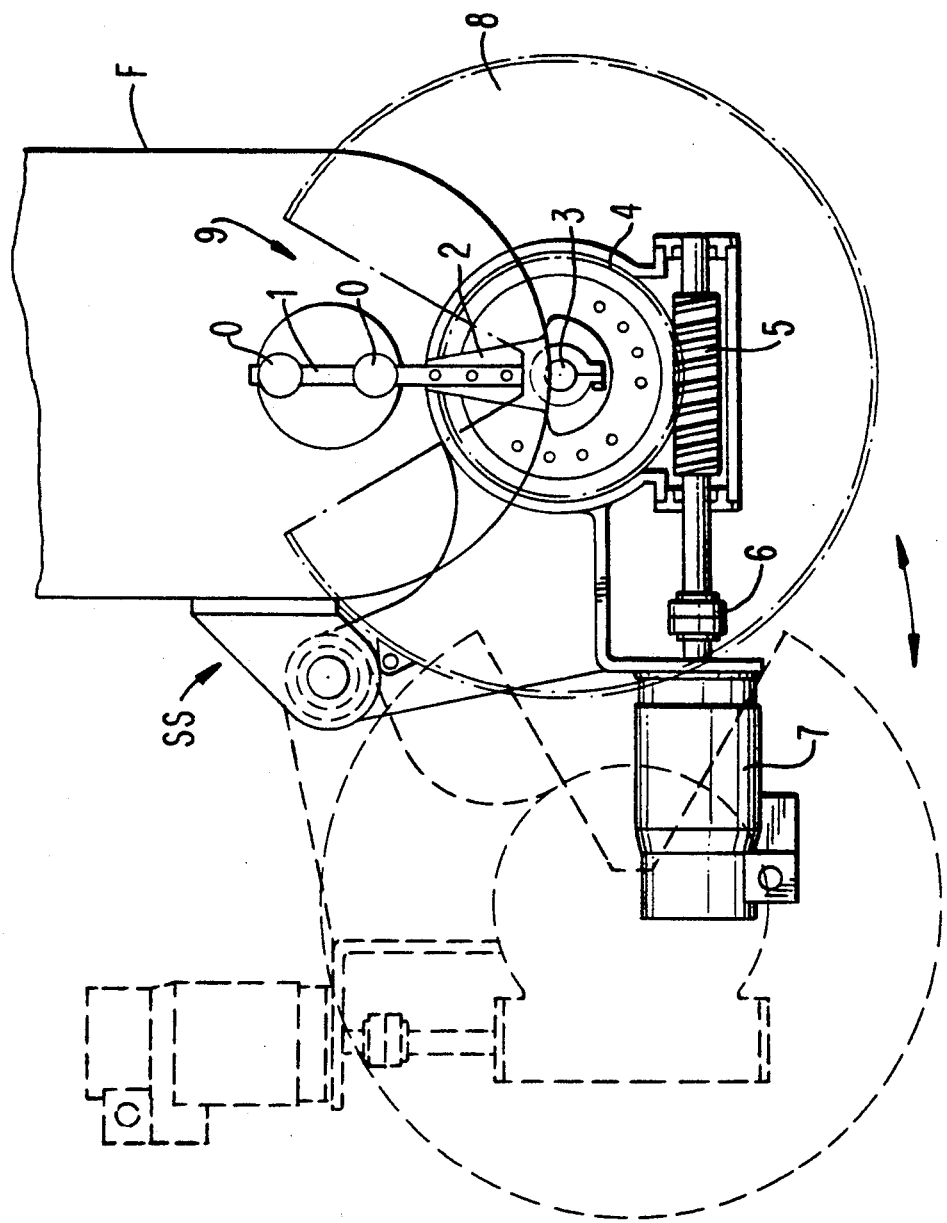
FIG. 1 is a schematic plan view of an embodiment of the shearing apparatus for forming glass gobs, in accordance with the present invention.

FIG. 1 of the drawings shows a preferred shearing apparatus for forming glass gobs, in accordance with the present invention.

A single shear blade 1 is coupled to a driving mechanism comprising an arm 2 mounted on a splined rotatory shaft 3 that extends parallel to the axis of feeding of a continuous flow of molten glass flowing from one or mole orifices 0 of a molten glass feeder F. A worm gear 4 is mounted on said splined shaft 3 and is driven by a worm shaft 5 coupled, through a connector couple 6, to a servomotor 7. This imparts a rotatory movement to said shear blade 1, to cut off a molten glass gob each time said shear blade 1 coincides therewith, to form individual glass gobs on a predetermined cut off cycle.

The servomotor includes velocity control means to impart a velocity profile which is faster on reaching near the glass flow and slowly after cut off the glass gob, in accordance with a predetermined cut off cycle.

Said velocity profile comprises: starting from a minimum velocity wherein the shear blade is cooled, then uniformly accelerate the shear blade to a maximum velocity to impact the flow of molten glass and form a glass gob, and finally descelerate the shear blade to reach again said minimum velocity in a single unidirectional 360° rotation. A predetermined section of glass, corresponding to a desired form and weight of a glass gob, flows from said cut off moment to a following cut off cycle.

A circular hollow housing 8 covers said shear blade 1 to protect it and control its temperature by applying a cooling fluid. The housing having an open sector 9 placed under the orifices 0 of the feeder F to allow the molten glass to freely flow from the feeder F and be cut off by the blade 1.

A support structure SS comprising a support frame 10 is fastened to one side of the feeder F. The support structure includes a screw-and-nut type adjusting column 11 having a holding frame 12 supporting said shear blade 1, the driving mechanism and the hollow housing 8, and is operative to adjust the height and position of the shear blade I with respect to the feed orifice 0 and to allow displacement of the entire apparatus for cleaning said orifices O.

It will be understood that the shearing action is imparted by the rotation of the shear blade 1, cutting off a glass gob each time said shear blade 1 coincides with said flow of molten glass.

What is claimed is:

1. A gob forming device having a cutting apparatus for forming molten glass gobs from a continuous flow of molten glass, comprising a single shear blade; drive means including an arm carrying the shear blade, mounted on a shaft parallel to the axis of the flow of molten glass, a worm wheel mounted on said shaft, a worm coupled to said worm wheel and a servomotor coupled to said worm, to impart a controlled rotary movement to said blade, to cut said flow of molten glass to thereby form molten glass gobs; control means to control the velocity profile of said servomotor and said shear blade, wherein said shear blade is faster when it strikes the flow of molten glass than after a glass gob has been cut off, a hollow housing covering said shear blade, arm, shaft, worm gear and gear, to control the temperature thereof by a cooling fluid fed through said hollow housing, having an uncovered portion which allows the molten glass to freely fall; and a holding frame supporting said drive means coupled to a screw-and-nut type adjusting column supported by a support frame fastened to a glass feeder, to adjust height and position of the apparatus and allow displacement of the apparatus for cleaning and maintaining purposes.

* * * * *